United States Patent [19]

Levine

[11] Patent Number: 4,689,464
[45] Date of Patent: Aug. 25, 1987

[54] APPARATUS FOR MANUFACTURING RINGS

[76] Inventor: Jesse Levine, 2741 E. 28th St., Brooklyn, N.Y. 11235

[21] Appl. No.: 698,935

[22] Filed: Feb. 7, 1985

[51] Int. Cl.$^4$ .............................................. B23K 11/00
[52] U.S. Cl. ............................... 219/78.01; 219/86.24; 219/86.7; 29/160.6
[58] Field of Search ............... 219/78.01, 86.24, 86.25, 219/86.7, 86.1; 29/148, 160.6

[56] References Cited

U.S. PATENT DOCUMENTS

| | | | |
|---|---|---|---|
| 3,766,809 | 10/1973 | Schneider | 29/160.6 X |
| 3,909,575 | 9/1975 | Phares et al. | 219/50 |
| 4,163,142 | 7/1979 | Descovich et al. | 219/79 |
| 4,453,072 | 6/1984 | Middleton et al. | 219/86.33 X |
| 4,473,734 | 9/1984 | Henry | 219/86.25 X |

Primary Examiner—E. A. Goldberg
Assistant Examiner—C. M. Sigda
Attorney, Agent, or Firm—Frishauf, Holtz, Goodman & Woodward

[57] ABSTRACT

An assembly apparatus for assemblying rings comprises a support (10, 11, 12); and a ring shank holding stud (20) connected to the support, the stud (20) including an electrically conductive portion for receiving a metallic ring shank thereon. An electrode (44) is coupled to the ring setting through a collet (52) which engages the ring setting, for supplying electrical current to the setting. A ring shank holder (14) fixedly holds the ring shank in a pre-determined position relative to the ring shank holding stud (20), whereby the ring shank and setting are held in a pre-determined fixed position relative to each other. Electrical current is supplied to the electrode (44) and to the ring shank holding stud (20) so that the electrical current passes through the setting and the ring shank so as to weld the setting to the ring shank.

25 Claims, 15 Drawing Figures

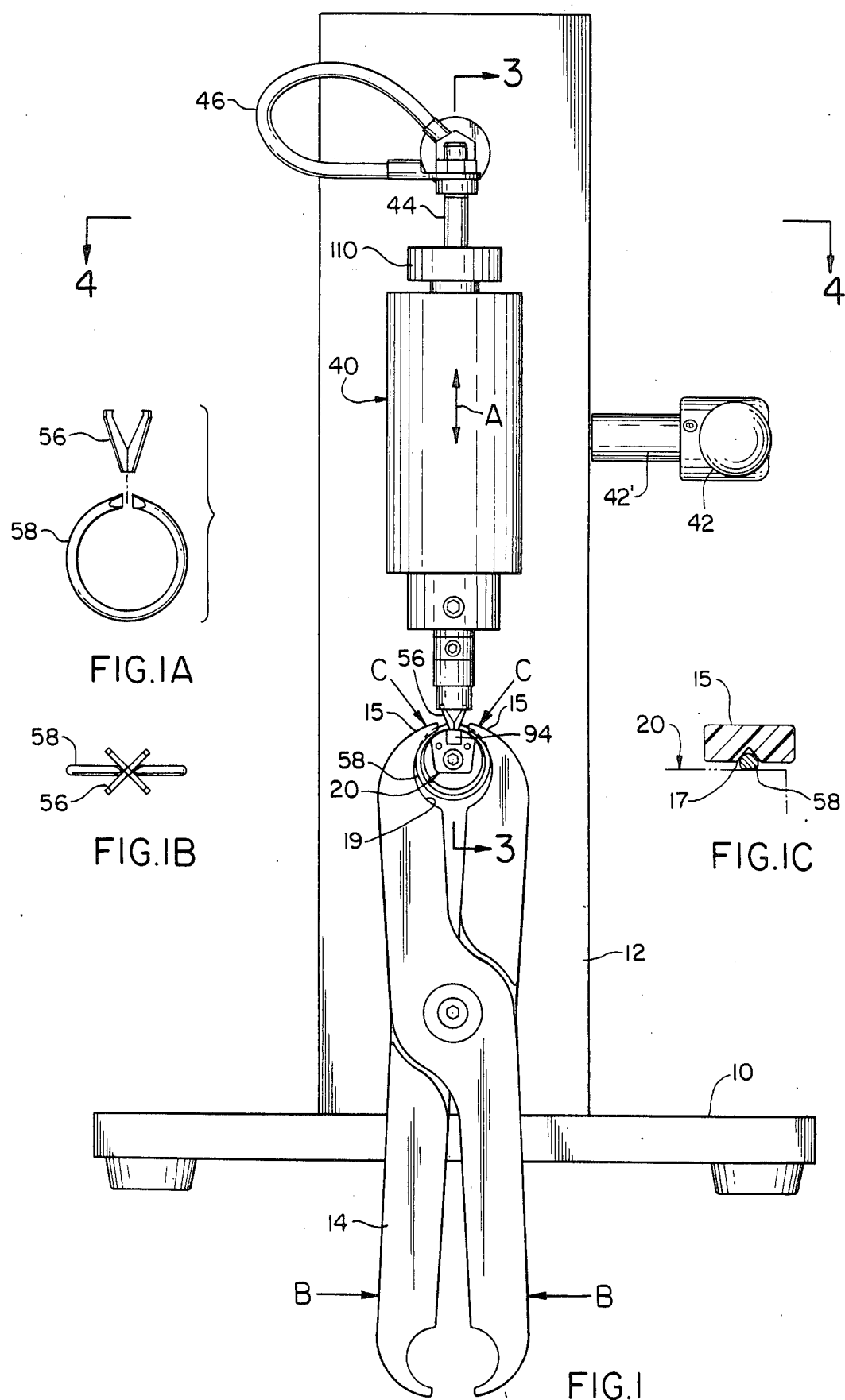

APPARATUS FOR MANUFACTURING RINGS

BACKGROUND OF THE INVENTION

This invention relates to an assembly apparatus for manufacturing rings, specifically solitaire type rings, and more particularly to an assembly apparatus for affixing a setting for stones onto a ring shank.

Heretofore, assembly of solitaire type rings with settings for stones has been conducted by hand. More particularly, an operator manually attaches and aligns the setting to the ring shank by hand and then solders them together. This technique is time consuming and often results in defective products since it is very difficult to exactly align the various parts with respect to each other by eye. Also, during soldering, the metal parts may move relative to each other due to the soldering heat about (1600° F.).

The object of the present invention is to provide a mechanized apparatus to accurately and quickly connect by welding, with a high degree of precision and with proper alignment, a setting for a stone to a ring shank in such a manner that after the mechanical welding connection is made, the pieces may be further soldered together without concern of movement of metal parts when heat is applied in the soldering process. The soldering step, after welding, securely and permanently interconnects the setting and the ring shank.

SUMMARY OF THE INVENTION

According to the present invention, an assembly apparatus for assemblying rings comprises: support means (10, 11, 12); ring shank holding means (20) coupled to the support means, and including an electrically conductive portion for receiving a metallic ring shank thereon; and ring setting engaging means (52) for engaging a metallic ring setting which is to be attached to said ring shank. Further provided is electrode means (40, 44) coupled to said ring setting engaging (52) for supplying electrical current to said setting; holding means (14) for fixedly holding said ring shank in a pre-determined position relative to said ring shank holding means (20), said setting engaging means (52) engaging and holding said setting in a pre-determined fixed position relative to said ring shank; and means for applying electrical current to said electrode means (44) and to said ring shank holding means (20) so that the electrical current passes through said setting and said ring shank so as to weld said setting to said ring shank. Preferably pressure is applied to the setting so as to press it against the ring shank. A pliers-type mechanism for holding the ring shank in proper position and alignment on the ring shank holding means is also preferably provided.

BRIEF DESCRIPTION OF THE DRAWINGS

FIG. 1 is a front elevational view of an apparatus in accordance with the present invention showing a ring shank and setting mounted thereon;

FIG. 1A is a side view of a ring shank and setting showing the setting spaced above the shank prior to connection thereof;

FIG. 1B is a top view of the ring shank and setting showing the setting mounted on the ring shank;

FIG. 1C is a typical sectional view through the jaws of the pliers shown in FIG. 1 showing how the "V" groove holds the shank substantially perpendicular to a mandrel;

DETAILED DESCRIPTION

Figures 2, 2A:
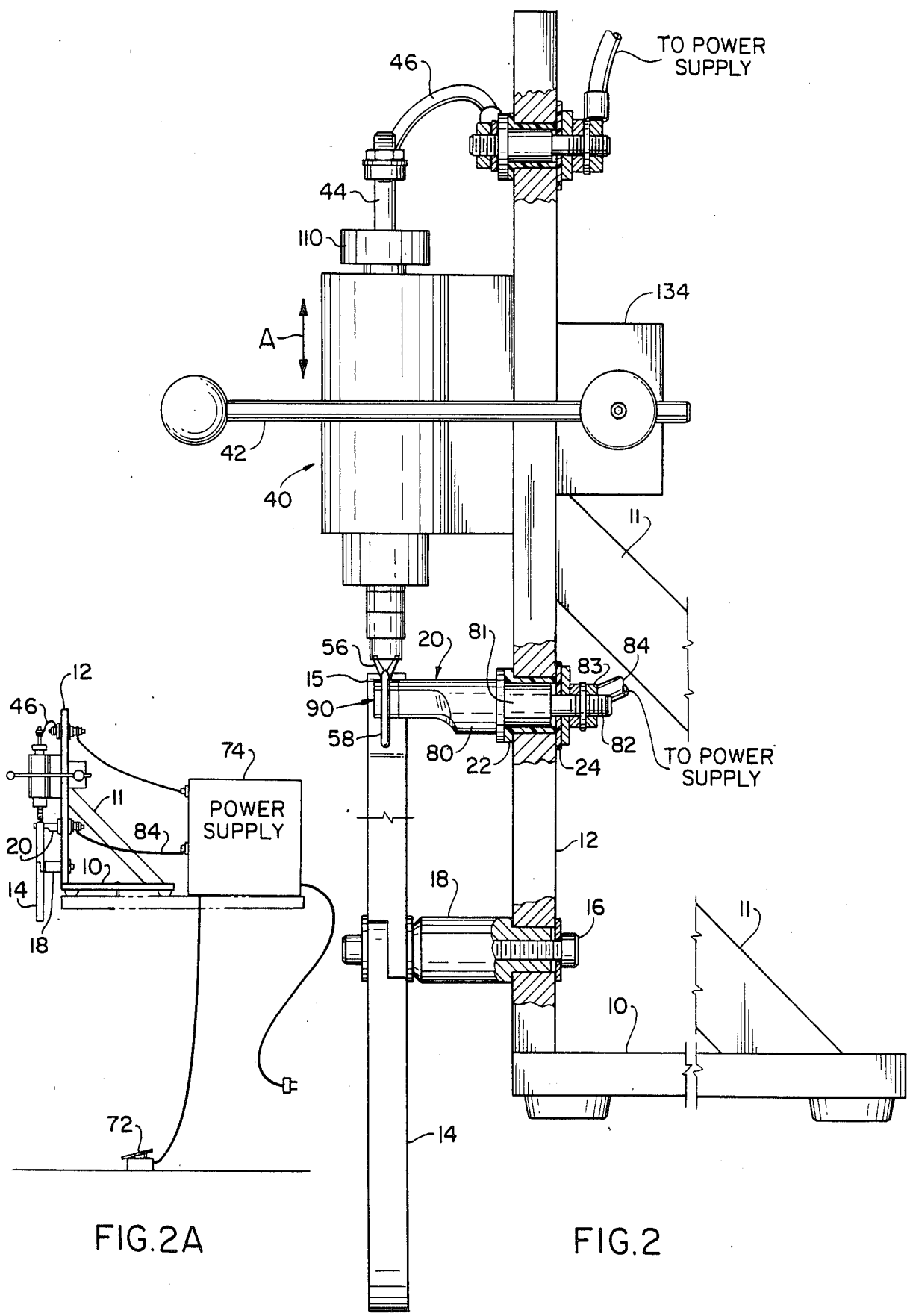
FIG. 2 is a side elevational view of the apparatus shown in FIG. 1, FIG. 2 being shown partially in section.
FIG. 2A is an overall schematic view of the apparatus of the present invention.

Referring to FIGS. 1 and 2, the apparatus according to the present invention comprises a base 10 and a vertical column 12 connected thereto. A brace 11 reinforces the structure. A plier type mechanism 14 (hereinafter referred to as "pliers") is pivotally mounted to a screw 16 which is connected to the vertical column 12 by means of a collar 18 which spaces the pliers horizontally from the vertical column 12 directly under the welding head 40 in exact alignment in all directions. A ring shank holding mechanism 20 is mounted to the vertical column by means of an insulating spacer 22 and an insulating washer 24, as best seen in FIG. 2. Details of the ring shank holding mechanism will be described hereinbelow.

Figure 3:
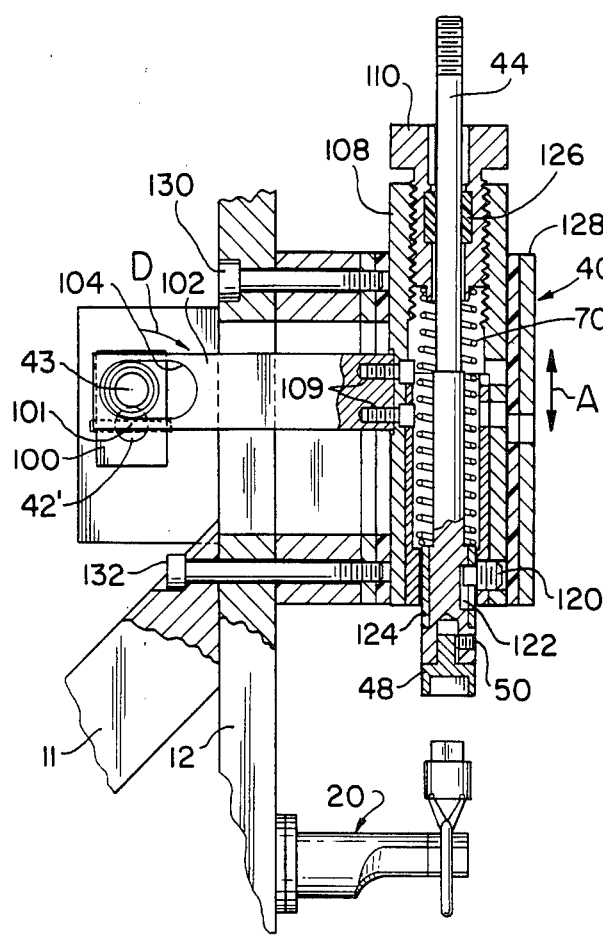
FIG. 3 is an enlarged detail of the operational portion of the apparatus of FIGS. 1 and 2, shown in the "upper" position.
Figure 3A:
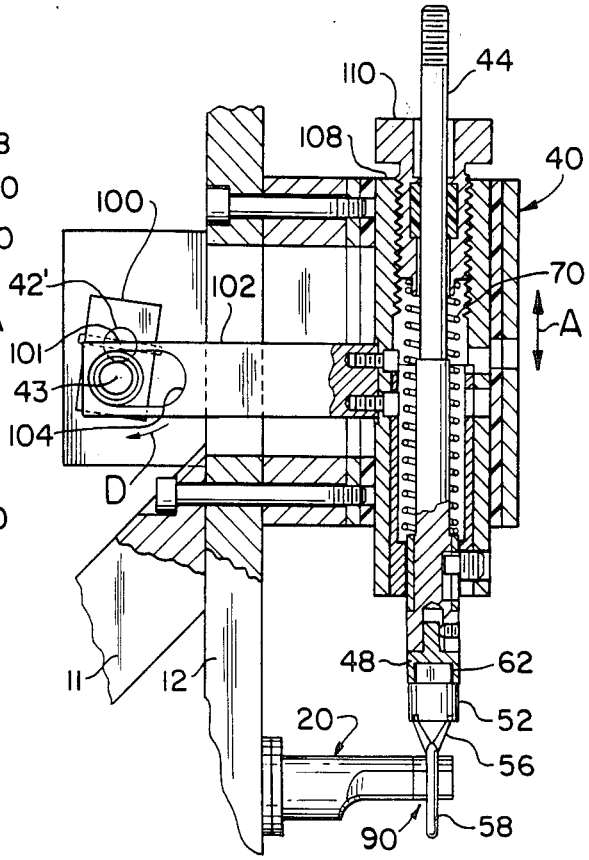
FIG. 3A is a view similar to FIG. 3, but showing the apparatus in the "down" or lowered position.

The mechanism further comprises a welding head 40 mounted to the column 12. As best seen in FIGS. 3 and 3A, the welding head 40 comprises an electrode 44 which is movable up and down in the vertical direction in the direction of the arrows A in FIGS. 1, 2, 3 and 3A. The electrode 44 is movable up and down in the direction of the arrow A by means of handle 42. The specific mechanism for moving the electrode 44 up and down will be discussed hereinbelow.

The electrode 44 is connected to electrical power by means of a cable 46 (see FIGS. 1 and 2).

Figure 5:
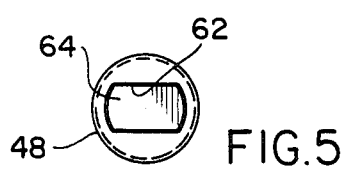
FIG. 5 shows an insert collet in detail.
Figure 6:
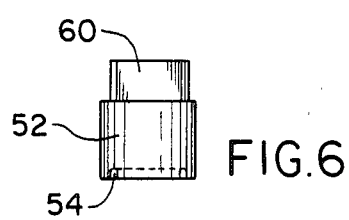
FIG. 6 shows a side view of a setting receiving insert collet which is removably received into the insert collet of FIG. 5.
Figure 7:
FIG. 7 is a bottom view of the insert collet of FIG. 6, showing the slots for holding a setting.
Figure 8:
FIG. 8 shows a bottom view of another embodiment of an insert collet showing a different slot arrangement for holding a different type of setting.

The electrode has, at its lower-most end, a collet receiving member 48 (see also FIG. 5) which is held in place by means of a set screw 50 (see FIGS. 3 and 3A). The receiving member 48 receives therein a setting-holding collet 52 which has grooves 54 therein for receiving and holding a setting 56. The setting is to be welded to the ring shank 58. As shown in FIGS. 7 and 8, the grooves 54,54' may take different shapes, depending upon the setting 56 to be used in a particular application. The collet 52 has flatted sides 60 which mate with flat sides 62 of an opening 64 in the lower portion of the receiving member 48. See FIGS. 5 and 6. These flats provide for proper alignment during use.

It is pointed out that the pliers are omitted from FIGS. 3 and 3A for ease of illustration.

In use, the ring shank 58 with a setting 56 engaged therewith is mounted on the ring shank holding mechanism 20, as shown in FIG. 3. The ring shank 58 has adjacent free ends, as seen in FIG. 1A. An appropriate collet 52 having the properly arranged slots is engaged with the upper tip portions of the setting 56, as shown in FIG. 3. Then, the handle 42 is operated by rotating same counterclockwise as seen in FIG. 2 to lower the electrode 44 to cause the receiving member 48 to engage over the projecting flatted portion 60 of the collet 52. This lowered position wherein the receiving member 48 is engaged with the collet 52 is shown in FIGS. 1, 2 and 3A. After the mechanism is lowered, pressure is applied by moving the handle to its most counterclockwise position so that the spring mechanism 70 (see FIGS. 3 and 3A) applies downward pressure on the electrode 44 to press the setting downwardly against the upper surface of ring shank holding mechanism 20, as shown in FIGS. 1, 2 and 3A. It is pointed out, that during the foregoing operational sequences, the ring shank is maintained in position on the ring holding mechanism 20 by means of the operator applying forces in the direction of the arrows B in FIG. 1 to the lower handle members of the pliers 14 to tightly grip and clamp downwardly the ring shank 58 as shown in FIGS. 1 and 2. This maintains all of the members in proper relative position and alignment during operation of the device. The pliers 14, arranged as seen in FIG. 1, constitute a clamping type ring shank engaging means.

When the electrode 44 is lowered to its lower most position, electrical power is supplied by operating the foot switch 72 shown in FIG. 2A which illustrates the schematic circuit of the overall embodiment. When the foot switch 72 is operated, the power supply 74 supplies power across the cable 46 and the ring shank holding machanism 20 to spot-weld the setting 56 to the shank 58. After application of the electrical power to produce the spot welding, the electrode 44 can be raised by rotating the handle 42 clockwise to release the receiving member 48 and collet 52 from the setting. Then, the pliers can be released and the assembled ring and setting can be removed from the mechanism 20.

The pliers 14 are fabricated of an insulating material in order to prevent current drain from parts being welded. The pliers 14 have jaw tips 15 which have grooves 17 formed therein, as best seen in FIG. 1C. The opening 19 of the jaws of the pliers is offset relative to the ring shank 58, as seen in FIG. 1. This offsetting feature, as well as the grooves 17 in the jaw tips, enable the pliers 14, when squeezed in the direction of the arrows B in FIG. 1, to apply downward pressure on the ring shank 58 against the shank holding mechanism 20 in the direction of the arrows C in FIG. 1. This enables a very good electrical contact to be made between the ring shank 58 and the electrically conducting portion of the shank holding mechanism 20 (to be described hereinbelow) so that better welding at the joint between the ring shank and the setting is achieved. It is desirable to have as low a resistence contact as possible between the ring shank 58 and the shank holding mechanism 20. As should be apparent, both jaw tips 15 of the pliers 14 have the groove 17 formed therein, as shown in FIG. 1C. The pliers 14 also maintain the ring shank square and properly aligned relative to the ring shank holder 20, as well as relative to the collet 52 and welding rod 44. The pliers 14 also keep pressure against the shank holding mechanism 20 to obtain better current flow. The grooves 17 extend over at least the portions of the jaw tips 15 which contact the ring shank 58.

In a preferred embodiment, the power supply 74, shown connected to the apparatus schematically in FIG. 2A, is a Joyal power source, model 120MFD. Clearly, other power supplies for use in welding equipment can be used.

Figures 9, 10:
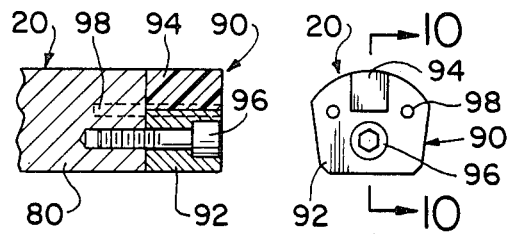
FIG. 9 is an end view of the lower electrode of the apparatus.
FIG. 10 is a sectional view taken along the line 10—10 and FIG. 9.

The ring shank holding mechanism 20 will now be described in greater detail with respect to FIGS. 1, 2, 9 and 10. As seen in FIGS. 2 and 10, the shank holding mechanism 20 comprises a stud 80 preferably made of metallic material and having a portion 81 thereof which passes through the vertical column 12 (FIG. 2) and which has a threaded screw member 82 projecting rearwardly of the vertical column 12 which is engaged by means of a threaded nut 83 which also mounts the electrical connector 84 which is connected to the power supply 74. An insulating bushing or spacer 22 having a shoulder thereon (seen in FIG. 2) is mounted around the portion 81 of the stud 80 so as to insulate the stud 80 from the vertical column 12. An insulating washer 24 is provided rearwardly of the vertical column 12 so as to maintain the insulating connection. At the forward end of stud 80 is a replaceable tip member 90 on which the ring shank rests during a welding operation, as shown in FIGS. 3 and 3A. The tip member 90 has a major portion 92 thereof made of metallic conducting material, preferably of the same type of conducting material as the stud 80. The tip member 90 has an insulating insert 94 mounted therein, and on which the ring setting is pressed during the welding operation. The insulating member 94 is generally rectangular in shape, and is replaceable. In use, the insulating member 94 may be scratched or become otherwise worn out, thereby necessitating replacement. The insulating portion 94 can be easily replaced by only replacing the tip member 90, without replacing the stud 80. The insulating portion 94 can alternatively be removably mounted in the tip member 90, so that it can be replaced without replacing the tip member 90. In use, the metallic portion 92 of the tip member 90 can be scored by improper pressure and resultant arcing during the welding operation. The tip member 90 can thus be easily replaced, without the necessity of dismantling the complete stud 80, and therefore, without the necessity of carrying out a complete re-alignment of the apparatus to ensure proper operation. If the stud 80 is replaced, it is necessary to re-align same in order that the center of the insulating member is directly under the center-line of the welding head. This is a critical operation which must be accurately carried out. By replacing only the tip end portion 90, there is no necessity to realign the apparatus, since the tip end portion 92 is self-aligning with respect to the stud portion 80, as described below.

The tip end portion 90 is removably connected to the main stud portion 80 by means of a screw 96. The tip end portion 92 is aligned relative to the main stud portion 80 by means of pins 98 which extend through the tip end portion 92, as well as through bores in the main stud portion 80. Upon tightening of the screw 96, the tip end portion 92 is securely locked and aligned relative to the stud portion 80. The guide pins 98 may be connected to the tip end portion 92 or the stud portion 80, or may be slideable in bores of both portions 80 and 92.

If desired, the entire ring shank holding mechanism 20 can be made in one piece, which is replaceable by removal of the threaded nut 83. In some instances, it may be desired to replace the entire ring shank holding mechanism 20 rather than to replace merely the tip end portion 90 and/or the insulating member 94.

The mechanism for moving the electrode 44 up and down will now be discussed with reference to FIGS. 3 and 3A.

Upon turning the handle 42 in the direction of arrow D in FIGS. 3 and 3A to lower the electrode 44 to the position shown in FIG. 3A, a crank 100 connected to the handle shaft 43 is also rotated in the clockwise direction from the position shown in FIG. 3 to the position shown in FIG. 3A. The handle 42 is connected to handle shaft 42' (see FIG. 1) which rotates the crank 100 about the axis 101 of handle shaft 42'. The rotation of the crank 100 is about the axis 101 of handle shaft 42'. During rotation of the crank 100, a horizontal bar 102 having an elongated slot 104 therein is moved from its upper position in FIG. 3 to its lower position in FIG. 3A, by movement of the crank follower 43 in the elongated slot 104.

The horizontal bar 102 is fixedly connected to an outer cylinder 108 by means of screws 109 so that the outer cylinder 108 is lowered along with the bar 102 to its position shown in FIG. 3A during clockwise turning of the handle member 42 as seen in FIGS. 3 and 3A. Upon lowering of the outer cylinder 108, the entire electrode mechanism is lowered so that the receiving member 48 presses against the collet 52, as seen in FIG. 3A. Upon continued downward movement of the horizontal bar 102 and outer cylinder 108, after the receiving member 48 contacts the collet 52 and applies downward pressure thereto, there is no further movement of the electrode 44, receiving member 48 and collet 52 in the downward direction. However, further downward movement of the outer cylinder 108 is permitted by virtue of the spring biasing force of the spring 70 against the spring pressure adjusting member 110. It is noted that the electrode 44 is slideably mounted within the inner bore of the spring pressure adjusting member 110. Adjusting member 110 is threadably inserted into the outer cylinder 108. By turning the adjusting member 110 inwardly into the cylinder 108, the spring pressure of spring 70 is increased, and vice versa. In this manner, it is easy to adjust the total amount of pressure applied by the downwardly moved electrode 44 against the setting 56 to obtain best welding results. It is also pointed out that when squeezing the pliers 14, the force C shown in FIG. 1 has a vertical component which also applies a downward pressure force of the ring shank against the shank holding mechanism 20 to improve contact. After the receiving member 48 contacts the collet 52 and all of the members are in contact as shown in FIG. 3A, continued turning of handle 42 over about 10° causes the crank follower 43 to move "past center" in the opening 104 of bar 102 to "lock" the mechanism in the downward position of FIG. 3A. This constitutes an "over-center" mechanism. The operator can release the handle 42 in this locked position and the mechanism will stay in the FIG. 3A position until the handle is released by turning same in the opposite direction of arrow D in FIGS. 3 and 3A.

A set screw 120 is provided to retain the electrode 44 in the cylindrical member 108. The set screw 120 is arranged in a recess 122 in the electrode 44 to permit relative movement of the cylinder 108 relative to the electrode 44 against the spring bias pressure of spring 70 when the apparatus is in the position shown in FIG. 3A. The set screw 120 and recess 122 cooperate to hold the electrode 44 in place when the mechanism is in the position shown in FIG. 3. A steel sleeve 124 is mounted around the lower portion of the electrode 44 to serve as a bearing against the lower portion of the cylinder 108, to prevent wear of the electrode. A sleeve bearing 126 is mounted around the upper portion of the electrode 44.

Figure 4:
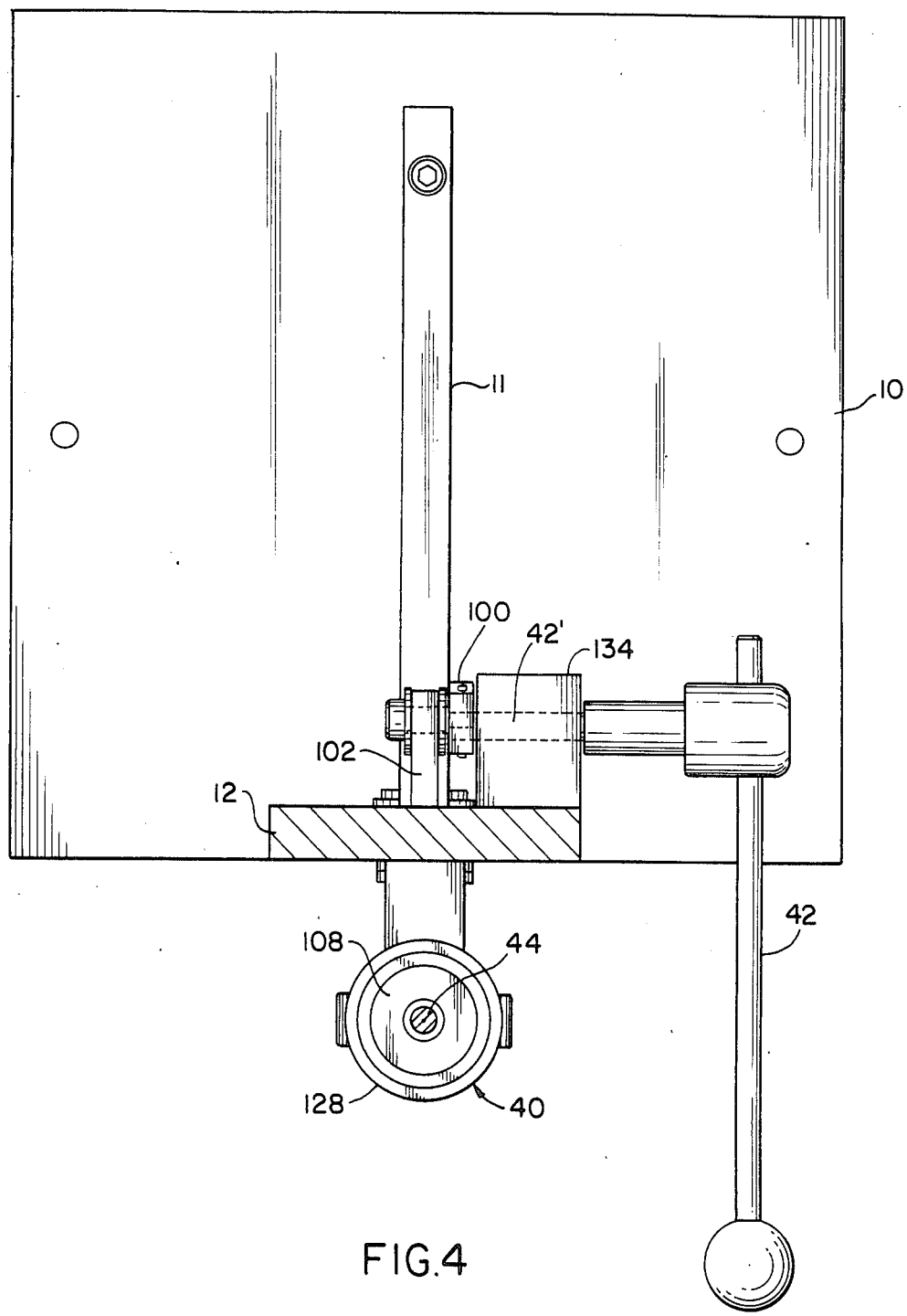
FIG. 4 is a sectional view taken along line 4—4 in FIG. 1.

The cylinder 108 is mounted within outer cylindrical member 128 in a slideable manner. Screw members 130, 132 retain the outer cylindrical members 128 to the vertical column 12. As seen in FIGS. 2 and 4, the shaft 42' of the handle 42 is journaled in a housing 134.

The ring shank and the setting are preferably made of gold (14 K, 18 K, etc.), or may be made of any other metallic material capable of being welded, such as platinum, silver, etc. Electrode 44 is preferably made of copper, as are the receiving member 48, collets 52, and ring shank holding and positioning mechanism 20 (shank 80 and metallic portion of tip end portion 90). Copper is preferred since it is a excellent electrical conductor. Insulating member 94 may be a hard plastic or other hard insulator, such as, for example, polypropylene, which is resistant to wear.

The handle 42 may be replaced, for example, by a large knurled knob or other mechanism having similar functional effects. The brace 11 may be omitted.

As seen in FIG. 1, the setting 56 is narrower than the insulating member 94 in the circumferential direction of the ring shank 58. Thus, during welding, the contact point between the setting 56 and the ring shank 58 is over the insulating member 94, and is not over the metallic portions of the ring shank holding mechanism 20. This is to improve current flow across the joining junction between the ring shank and the setting during the welding operation since current is not drained off by the ring shank holding mechanism 20.

The collets 52 are an important feature of the present invention in that they have grooves 54, 54' (FIGS. 7 and 8) which engage the ends of the prongs of the settings, as shown for example in FIGS. 1, 2, 3 and 3A. The groove configuration (54, 54') is different for different types of ring settings 56. For example, the collet 52 of FIG. 7 is useful for a four prong setting, whereas the collet 52' of FIG. 8 is used for a six prong setting. Moreover, the width of the grooves is different for different types of settings depending upon the thickness of the prongs to be engaged with the collets. By arranging the grooves and dimensioning them for tight engagement with the prongs of the setting, good current transfer therebetween is insured, improving the efficiency of the welding operation. As shown in FIG. 3, the collets 52 are preferably engaged with the prongs of the setting 56 prior to lowering of the electrode 44. The collet 52 has flatted side portions 60 which engage flatted portions 62 of the receiving member 48 to insure proper alignment of parts when downward pressure is applied.

Using the apparatus of the present invention, an operator can easily and quickly set up the ring shank (using pliers 14) and setting in desired positions, and may then merely lower the welding electrode 44 by turning the handle 42 as described above. When the lowering and pressure applying operations (i.e., by pliers 14 and spring 70) are completed, the operator actuates switch 72 to spot weld the setting 56 to the shank 58. The spot weld connection is sufficiently strong to hold the setting onto the shank with the exact proper relative orientation, and the ring is then finished by conventional soldering techniques to fill in the spaces between the setting and the ring shank to integrally join them together.

I claim:

1. An assembly apparatus for assembling rings, comprising:
   support means (10, 11, 12);
   ring shank holding means (20) coupled to said support means, and including an electrically conductive portion for receiving a metallic ring shank thereon, said ring shank having free ends in the vicinity of each other;
   ring setting engaging means (52) for engaging a metallic ring setting which is to be attached to said ring shank;
   electrode means (40, 44) carrying said setting engaging means (52) for supplying electrical current to said setting;
   a clamping type ring shank engaging means (14) coupled to said support means for engaging a ring shank and fixedly holding said ring shank in a pre-determined position on said ring shank holding means (20), said setting engaging means (52) engaging and holding said setting in a pre-determined fixed position relative to said ring shank; and
   means for applying electrical current to said electrode means (44) and to said ring shank holding means (20) so that the electrical current passes through said setting and said ring shank so as to weld said setting to said ring shank;
   said clamping type ring shank engaging means (14) including means for engaging and clamping the free end portions of said ring shank and for applying an inward pressure on said ring shank so as to force said free ends of said ring shank towards each other and for pressing at least the free end portions of said ring shank against said holding means (20) to improve electrical contact between said ring shank and said holding means to thereby improve said weld produced by said electrical current.

2. The assembly apparatus of claim 1, wherein said clamping type ring shank engaging means (14) comprises a pliers-type mechanism which is pivotally mounted to said support means (12).

3. The assembly apparatus of claim 1, wherein said ring shank engaging means comprises a pliers mechanism having a pair of jaws (15) and a pair of handles coupled to said jaws, said jaws having respective grooves (17) therein for engaging said ring shank in a pre-determined position relative to said ring shank holding means (20), said jaws being arranged to press said ring shank inwardly and against said ring shank holding means (20) when said handles of said pliers are squeezed together to fixedly hold said ring shank in said pre-determined position on said ring shank holding means (20).

4. The assembly apparatus of claim 1, wherein said ring shank engaging means (14) further comprises grooves for engaging said ring shank and for maintaining said ring shank in a pre-determined position relative to said ring shank holding means (20).

5. The assembly apparatus of claim 1, wherein said electrode means comprises means for applying a pre-determined amount of pressure to said electrode means so as to press said electrode means against said ring setting engaging means so as to apply a pre-determined pressure between said setting and ring shank.

6. The assembly apparatus of claim 5, wherein said electrode means comprises an electrode rod (44) which is downwardly movable and wherein said pressure applying means comprises a spring member (70) coupled to said electrode rod; said pressure applying means further including means for lowering said electrode and spring member to said ring shank holding means (20).

7. The assembly apparatus of claim 6, wherein said lowering means comprises an over-center mechanism for applying spring pressure by said spring member to said electrode (44) after said electrode reaches a lowermost position.

8. The assembly apparatus of claim 7, wherein said over-center mechanism comprises locking means for locking said electrode in said lowermost position with said spring pressure applied thereto.

9. The assembly apparatus of claim 1, wherein said ring shank engaging means is made of insulating material to prevent current drain from said ring shank during operation.

10. The assembly apparatus of claim 2, wherein said pliers-type mechanism comprises insulating jaws for engaging said ring shank to prevent current drain from said ring shank during operation.

11. The assembly apparatus of claim 1, wherein said ring shank holding means comprises an insulating member on a surface thereof which contacts said ring shank, said insulating member extending along said ring shank holding means over a distance sufficient such that said setting is over said insulating member and not over electrically conductive portions of said ring shank holding means (20) during application of said electrical current.

12. The assembly apparatus of claim 11, wherein said insulating member is removably mounted on said ring shank holding means (20).

13. The assembly apparatus of claim 1, said ring shank holding means (20) comprises a replaceable tip end portion (92) and a stud (80) to which said tip end portion is removably connectable.

14. The assembly apparatus of claim 13, wherein said tip end portion comprises an insulating member embedded therein and arranged under a contact point with said ring shank, said insulating member extending over a portion of said tip end portion sufficient such that said setting, when placed over said ring shank in engagement with said ring shank is located over said insulating member and not over electrically conducting portions of said tip end portion.

15. The assembly apparatus of claim 14, further comprising guide pins coupled to at least one of said tip end portion and said stud for aligning said tip end portion with said stud; and means for fixedly connecting said tip end portion to said stud.

16. An assembly apparatus for assembling rings, comprising:
   support means (10, 11, 12);
   ring shank holding means (20) coupled to said support means, and including an electrically conductive portion for receiving a metallic ring shank thereon;
   ring setting engaging means (52) for engaging a metallic ring setting which is to be attached to said ring shank;
   electrode means (40, 44) carrying said setting engaging means (52) for supplying electrical current to said setting;
   ring shank engaging means (14) coupled to said support means for engaging a ring shank and fixedly holding said ring shank in a pre-determined position on said ring shank holding means (20), said setting engaging means (52) engaging and holding said setting in a pre-determined fixed position relative to said ring shank; and means for applying electrical current to said electrode means (44) and to said ring shank holding means (20) so that the electrical current passes through said setting and said ring shank so as to weld said setting to said ring shank;

said ring shank engaging means (14) being made of insulating material to prevent current drain from said ring shank during operation.

17. The assembly apparatus of claim 16, wherein said ring shank engaging means (14) further comprises means for pressing said ring shank against said ring shank holding means (20) so as to improve electrical contact between said ring shank and said ring shank holding means.

18. An assembly apparatus for assembling rings, comprising:

support means (10, 11, 12);

ring shank holding means (20) coupled to said support means, and including an electrically conductive portion for receiving a metallic ring shank thereon;

ring setting engaging means (529 for engaging a metallic ring setting which is to be attached to said ring shank;

electrode means (40, 44) carrying said setting engaging means (52) for supplying electrical current to said setting;

a pliers-type ring shank engaging means (14) pivotally mounted to said support means for engaging a ring shank and fixedly holding said ring shank in a pre-determined position in said ring shank holding means (20), said setting engaging means (52) engaging and holding said setting in a pre-determined fixed position relative to said ring shank; and means for applying electrical current so said electrode means (44) and to said ring shank holding means (20) so that the electrical current passes through said setting and said ring shank so as to weld said setting to said ring shank;

said pliers-type ring shank engaging means comprising insulating jaws for engaging said ring shank to prevent current drain from said ring shank during operation.

19. The assembly apparatus of claim 18, wherein said ring shank engaging means (14) further comprises means for pressing said ring shank against said ring shank holding means (20) so as to improve electrical contact between said ring shank and said ring shank holding means.

20. An assembly apparatus for assembling rings, comprising:

support means (10, 11, 12);

ring shank holding means (20) coupled to said support means, and including an electrically conductive portion for receiving a metallic ring shank thereon;

ring setting engaging means (52) for engaging a metallic ring setting which is to be attached to said ring shank;

electrode means (40, 44) carrying said setting engaging means (52) for supplying electrical current to said setting;

ring shank engaging means (14) coupled to said support means for engaging a ring shank and fixedly holding said ring shank in a pre-determined position in said ring shank holding means (20), said setting engaging means (52) engaging and holding said setting in a pre-determined fixed position relative to said ring shank; and means for applying electrical current to said electrode means (44) and to said ring shank holding means (20) so that the electrical current passes through said setting and said ring shank so as to weld said setting to said ring shank;

said ring shank holding means (20) comprising a replaceable tip end portion (92) and a stud (80) to which said tip end portion (92) is removably connectable, said tip end portion (92) comprising an insulating member (94) embedded therein and arranged under a contact point with said ring shank, said insulating member (94) extending over a portion of said tip end portion (92) sufficient such that said setting, when placed over said ring shank in engagement with said ring shank, is located over said insulating member (94) and not over electrically conducting portions of said tip end portion (92).

21. The assembly apparatus of claim 20, further comprising guide pins coupled to at least one of said tip end portion and said stud for aligning said tip end portion with said stud; and means for fixedly connecting said tip end portion to said stud.

22. The assembly apparatus of claim 20, wherein said ring shank engaging means (14) further comprises means for pressing said ring shank against said ring shank holding means (20) so as to improve electrical contact between said ring shank and said ring shank holding means.

23. An assembly apparatus for assembling rings, comprising:

support means (10, 11, 12);

ring shank holding means (20) coupled to said support means, and including an electrically conductive portion for receiving a metallic ring shank thereon;

ring setting engaging means (52) for engaging a metallic ring setting which is to be attached to said ring shank;

electrode means (40, 44) carrying said setting engaging means (52) for supplying electrical current to said setting;

ring shank engaging means (14) coupled to said support means for engaging a ring shank and fixedly holding said ring shank in a pre-determined position in said ring shank holding means (20), said setting engaging means (52) engaging and holding said setting in a pre-determined fixed position relative to said ring shank; and means for applying electrical current to said electrode means (44) and to said ring shank holding means (20) so that the electrical current passes through said setting and said ring shank so as to weld said setting to said ring shank;

said ring shank holding means comprises an insulating member on a surface thereof which contacts said ring shank, said insulating member extending along said ring shank holding means over a distance sufficient such that said setting is over said insulating member and not over electrically conductive portions of said ring shank holding means (20) during application of said electrical current.

24. The assembly apparatus of claim 23, wherein said insulating member is removably mounted on said ring shank holding means (20).

25. The assembly apparatus of claim 23, wherein said ring shank engaging means (14) further comprises means for pressing said ring shank against said ring shank holding means (20) so as to improve electrical contact between said ring shank and said ring shank holding means.

* * * * *